US009067512B2

(12) United States Patent  (10) Patent No.: US 9,067,512 B2
Cailleteau  (45) Date of Patent: Jun. 30, 2015

(54) ADJUSTABLE SEAT

(75) Inventor: Jeremy Cailleteau, St Aout (FR)

(73) Assignee: Zodiac Seats France, Issoudun (FR)

(*) Notice: Subject to any disclaimer, the term of this patent is extended or adjusted under 35 U.S.C. 154(b) by 249 days.

(21) Appl. No.: 13/440,164

(22) Filed: Apr. 5, 2012

(65) Prior Publication Data

US 2012/0256457 A1   Oct. 11, 2012

Related U.S. Application Data

(60) Provisional application No. 61/471,782, filed on Apr. 5, 2011.

(51) Int. Cl.
```
B60N 2/16      (2006.01)
B60N 2/04      (2006.01)
B60N 2/06      (2006.01)
B60N 2/24      (2006.01)
B64D 11/06     (2006.01)
```

(52) U.S. Cl.
CPC .............. B60N 2/045 (2013.01); B60N 2/062 (2013.01); B60N 2/1615 (2013.01); B60N 2/164 (2013.01); B60N 2/24 (2013.01); B64D 11/0689 (2013.01); B64D 11/064 (2014.12); B64D 11/06395 (2014.12)

(58) Field of Classification Search
CPC ...... B60N 2/1615; B60N 2/045; B60N 2/062; B64D 11/064; B64D 11/0689
USPC ................ 297/308, 307; 248/564, 424, 188.8
See application file for complete search history.

(56) References Cited

U.S. PATENT DOCUMENTS

| | | | |
|---|---|---|---|
| 3,139,304 A | | 6/1964 | Lehner et al. |
| 3,268,200 A | * | 8/1966 | Eicher ........................ 248/564 X |
| 3,423,060 A | * | 1/1969 | Manfred et al. ............... 248/575 |
| 3,572,828 A | | 3/1971 | Lehner |
| 4,047,759 A | | 9/1977 | Koscinski |
| 6,296,221 B1 | * | 10/2001 | Nadeau .......................... 297/308 |
| 8,308,578 B2 | * | 11/2012 | Gilbert et al. ........... 297/260.2 X |

FOREIGN PATENT DOCUMENTS

| | | |
|---|---|---|
| DE | 202004020657 U1 | 9/2005 |
| EP | 0029997 A1 | 6/1981 |
| FR | 1550068 A | 12/1968 |

OTHER PUBLICATIONS

International Search Report dated Aug. 27, 2012 in related Application No. PCT/IB2012/000948.
International Preliminary Report on Patentability dated Oct. 17, 2013 in related Application No. PCT/IB2012/000948.

* cited by examiner

*Primary Examiner* — Anthony D Barfield
(74) *Attorney, Agent, or Firm* — Kilpatrick Townsend & Stockton LLP; Dean W. Russell; Tiffany L. Williams

(57) ABSTRACT

Described are adjustable seats including an upper frame with a pair of support arms, a lower frame with a pair of support legs, and a coupling system with an upper rod and a lower rod. As examples, the upper rod and the lower rod are pivotally coupled to each of the pair of support arms and the pair of support legs. A linear actuator is coupled to the upper frame, and a track is coupled to the lower frame, wherein the linear actuator is configured to travel along the track. The linear actuator may comprise a first end and a second end, wherein the first end is coupled to a coupling location on the lower frame and the second end is coupled to a coupling location on the coupling system.

13 Claims, 11 Drawing Sheets

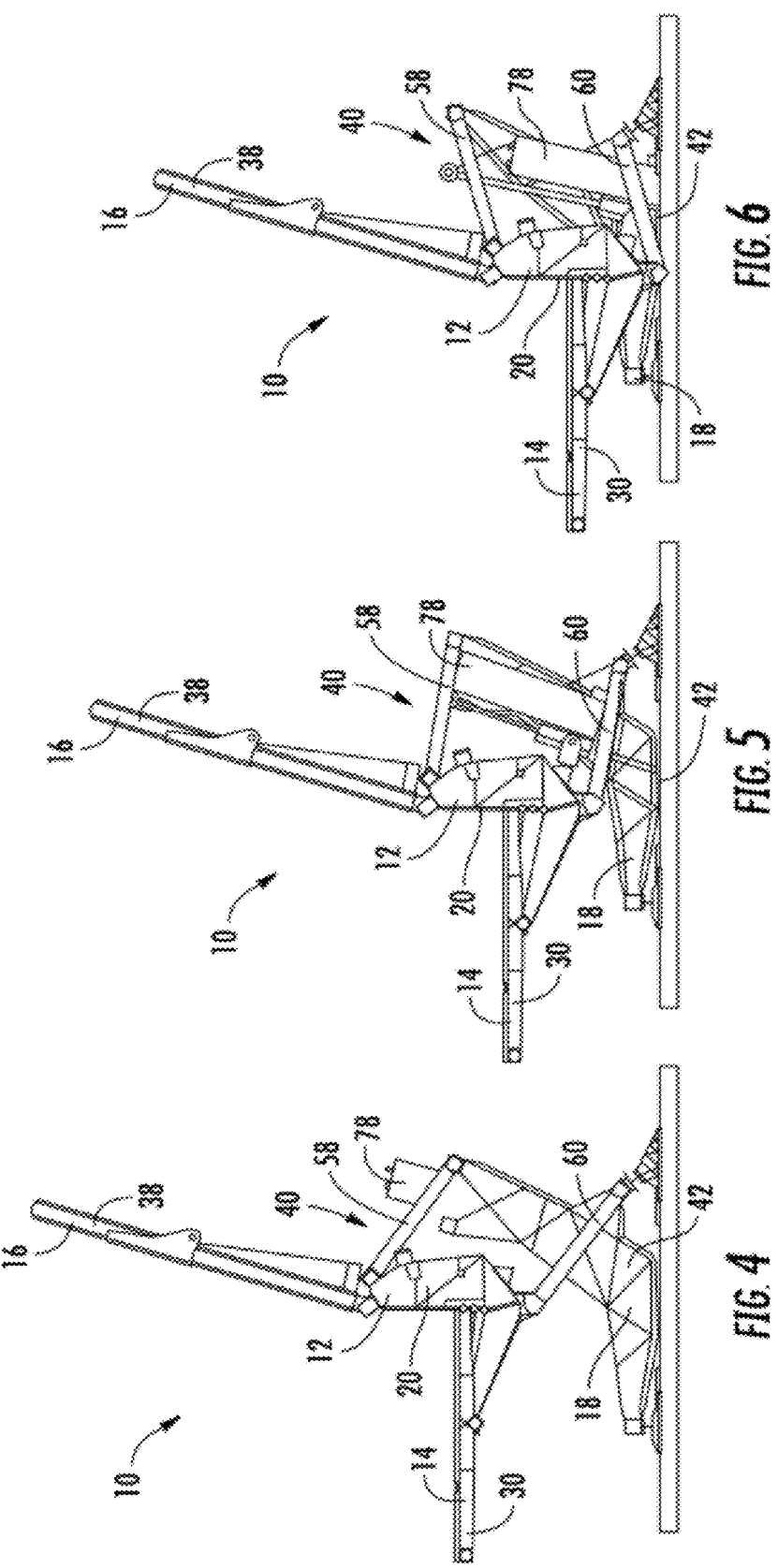

ADJUSTABLE SEAT

CROSS REFERENCE TO RELATED APPLICATIONS

This application is related to and claims priority benefits from U.S. Provisional Application Ser. No. 61/471,782, filed on Apr. 5, 2011, entitled PILOT SEAT FOR AIRCRAFT. The '782 application is hereby incorporated in its entirety by this reference.

FIELD OF THE INVENTION

The field of the invention relates to pilot seats or the like.

BACKGROUND

Many common carriers, such as passenger airlines, bus lines, and train lines, include a cockpit or command center where the pilot or driver controls the common carrier. In many cases, the typical seating height and/or lateral position may be insufficient for the pilot or driver to fully view his or her surroundings in order to properly anticipate, respond, and/or avoid incidents. In particular, the size and/or shape of the common carrier may be such that a portion of the field of vision is obstructed or difficult to easily view from the typical seating height and/or lateral position.

As a result, it may be desirable to provide a seat with extensive vertical and/or lateral adjustment options to adjust the seat position as needed to provide the pilot or driver with the ability to view the full area of vision as needed or desired.

SUMMARY

Embodiments of the present invention include an adjustable seat comprising an upper frame comprising a pair of support arms, a lower frame comprising a pair of support legs, and a coupling system comprising an upper rod and a lower rod. A seat pan may be pivotally coupled to the upper frame, and a back rest may be pivotally coupled to the upper frame. The support legs may be slidingly coupled to a forward cross bar and an aft cross bar.

The upper rod and the lower rod may be pivotally coupled to each of the pair of support arms and the pair of support legs, and may have substantially similar lengths. The position of the pivotal coupling between the upper rod and the pair of support arms may be substantially vertically aligned with the position of the pivotal coupling between the lower rod and the pair of support arms. Likewise, the position of the pivotal coupling between the upper rod and the pair of support legs may be substantially vertically aligned with the position of the pivotal coupling between the lower rod and the pair of support legs. As a result, the upper rod, the lower rod, a line connecting the substantially vertical pivotal coupling locations on each support arm, and a line connecting the substantially vertical pivotal coupling locations on each support leg may form a parallelogram shape.

In some embodiments, a linear actuator may be coupled to the upper frame, and a track coupled to the lower frame, wherein the linear actuator is configured to travel along the track. In other embodiments, the linear actuator may comprise a first end and a second end, wherein the first end is coupled to a coupling location on the lower frame and the second end is coupled to a coupling location on the coupling system. The coupling location on the coupling system may comprise a cross bar positioned on the upper rod or the lower rod.

In these embodiments, the upper frame is in a high position when the linear actuator is positioned proximate an upper end of the track and the upper rod and the lower rod are angled upward in a forward direction, and the upper frame is in a low position when the linear actuator is positioned proximate a lower end of the track and the upper rod and the lower rod are angled downward in a forward direction.

BRIEF DESCRIPTION OF THE DRAWINGS

FIG. 4 is a side view of the seat of FIG. 1 in a high position with a portion of the support leg not shown for purposes of illustrating the linear actuator and coupling arrangements.

FIG. 5 is a side view of the seat of FIG. 1 in a medium position with a portion of the support leg not shown for purposes of illustrating the linear actuator and coupling arrangements.

FIG. 6 is a side view of the seat of FIG. 1 in a low position with a portion of the support leg not shown for purposes of illustrating the linear actuator and coupling arrangements.

DETAILED DESCRIPTION

Figure 1:
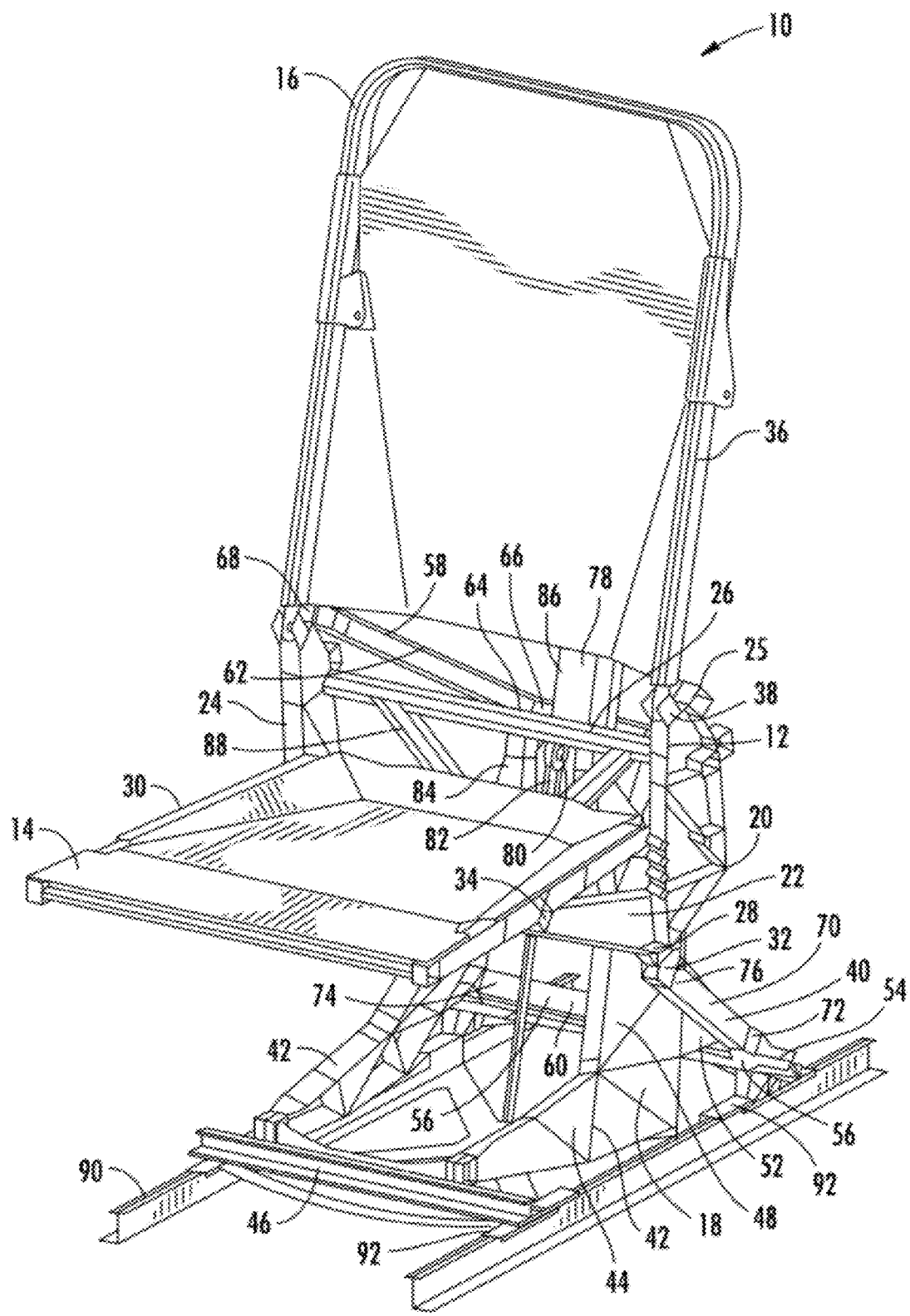
FIG. 1 is a perspective view of a seat according to certain embodiments of the present invention.

Embodiments of the invention provide seats with a range of adjustment options. While the seats are discussed for use with aircraft, particularly as pilot seats, they are by no means so limited. Rather, embodiments of the seats may be used with any type of vehicle or otherwise as desired.

FIGS. 1-13 illustrate embodiments of a seat 10. In some embodiments, the seat 10 comprises an upper frame 12, a seat pan 14, a back rest 16, and a lower frame 18. The upper frame 12, the seat pan 14, the back rest 16, and/or the lower frame 18 may be formed of materials including but not limited to aluminum, stainless steel, other metallic materials, composite materials, or other similar materials.

In some embodiments, as illustrated in FIGS. 1-6 and 9-10, the upper frame 12 may include a pair of support arms 20. Each support arm 20 may have an "L" shape. However, one of ordinary skill in the relevant art will understand that the support arms 20 may have any suitable shape that provides sufficient support and stability for the seat 10.

A lower portion 22 of each support arm 20 may extend in a forward direction to provide support and/or a coupling location for the seat pan 14, while an upper portion 24 of each support arm 20 may extend in an upward direction to provide support and a coupling location for the back rest 16, as well as an upper rod forward pivot coupling location 25, which is discussed in detail below. An upper cross bar 26 may be positioned between the upper portions 24. A lower aft end 28 of each support arm 20 may be configured to provide a lower rod forward pivot coupling location 32, which also is discussed in detail below.

In these embodiments, the upper cross bar 26 and the support arms 20 serve as the primary structure of the upper frame 12. The upper cross bar 26 may be welded, integrally formed, or otherwise joined to the support arms 20 via mechanical fasteners, such as bolts, rivets, screws, or other suitable fasteners. One of ordinary skill in the relevant art will understand that any suitable shape or coupling between the upper cross bar 26 and the support arms 20 may be used that will provide sufficient stability and strength for the upper frame 12.

Figure 9:
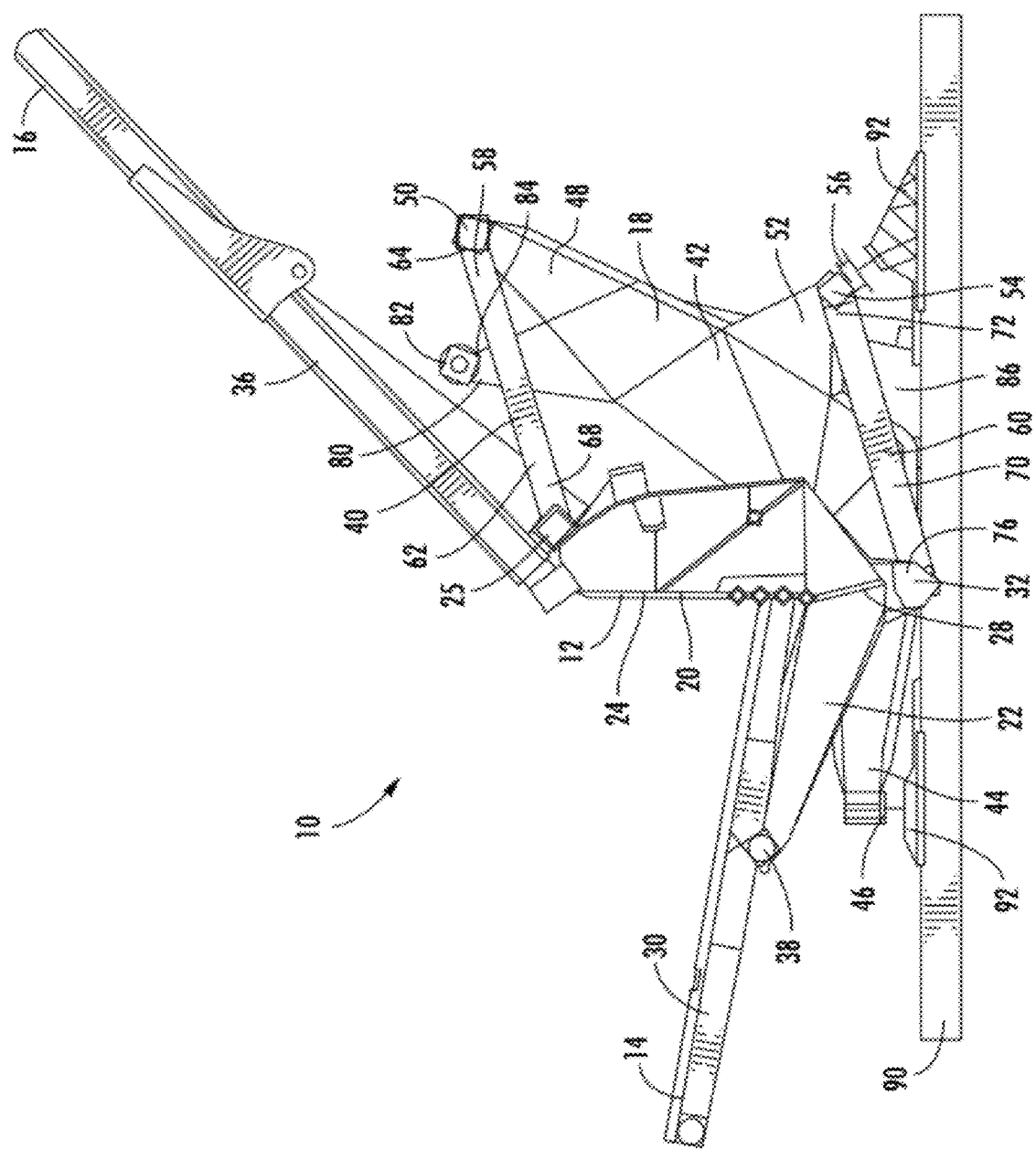
FIG. 9 is a side view of the seat of FIG. 1 with the seat back and the seat pan in a reclined position.

In certain embodiments, as shown in FIGS. 1, 3-6, and 9-10, the seat pan 14 includes a frame 30. The frame 30 may be coupled to the lower portion 22 of each support arm 20 via coupling locations 34 on the frame 30 and the lower portions 22. In the embodiments where the seat pan 14 is fixedly coupled to the support arms 20, mechanical fasteners, such as bolts, rivets, screws, or other suitable fasteners, may be inserted through the coupling locations 34. In other embodiments, the frame 30 may be welded, integrally formed, or otherwise joined to the support arms 20. In yet other embodiments, the frame 30 may be pivotally coupled to the support arms 20. In these embodiments, a pivot bar or other pivotal coupling mechanism may be inserted through the coupling locations 34 to allow the frame 30 to pivot relative to the support arm 20 (as best illustrated in FIG. 9). One of ordinary skill in the relevant art will understand that a recline lock or other suitable mechanism may be used to control the rotation of the seat pan 14 relative to the support arm 20.

According to some embodiments, as illustrated in FIGS. 1, 3-6, and 9-10, the back rest 16 may also include a frame 36. The frame 36 may be coupled to the upper portion 24 of each support arm 20 via coupling locations 38 on the frame 36 and the upper portions 24. In the embodiments where the back rest 16 is fixedly coupled to the support arms 20, mechanical fasteners, such as bolts, rivets, screws, or other suitable fasteners, may be inserted through the coupling locations 38. In other embodiments, the frame 36 may be welded, integrally formed, or otherwise joined to the support arms 20. In yet other embodiments, the frame 36 may be pivotally coupled to the support arms 20. In these embodiments, a pivot bar or other pivotal coupling mechanism may be inserted through the coupling locations 34 to allow the frame 36 to pivot relative to the support arm 20 (as best illustrated in FIG. 9). One of ordinary skill in the relevant art will understand that a recline lock or other suitable mechanism may be used to control the rotation of the back rest 16 relative to the support arm 20.

The seat pan 14 and/or the back rest 16 may include a cushion to provide additional comfort and support for a person seated in the seat 10. The covering of the cushion may be formed of any suitable material including but not limited to textiles, woven or nonwoven fabrics, leather, synthetic materials, plastics, or other similar materials. The internal composition of the cushion may include any suitable material that provides a comfortable resting location for a passenger, while providing a durable material that will withstand repeated usage. The type of internal cushion material includes but is not limited to viscoelastic materials, foam materials, honeycomb-shaped materials, cushioning materials, or other similar materials.

As illustrated in FIGS. 1-6 and 9-10, the upper frame 12 may be pivotally coupled to the lower frame 18 via a coupling system 40, which is described in detail below. In these embodiments, the lower frame 18 may include a pair of support legs 42. Each support leg 42 may have an "L" shape. However, one of ordinary skill in the relevant art will understand that the support legs 42 may have any suitable shape that provides sufficient support and stability for the seat 10.

A lower portion 44 of each support leg 42 may extend in a forward direction to provide support and a forward coupling location for a forward cross bar 46, while an upper portion 48 of each support leg 42 may extend in an upward direction to provide support and an upper rod aft pivot coupling location 50, which is discussed in detail below. A lower aft end 52 of each support leg 42 may be configured to provide a lower rod aft pivot coupling location 54 and/or an aft coupling location for an aft cross bar 56.

In these embodiments, as shown in FIGS. 1, 7-8, and 10-13, the forward cross bar 46, the aft cross bar 56, and the support legs 42 serve as the primary structure of the lower frame 18. The forward cross bar 46 and/or the aft cross bar 56 may be welded, integrally formed, or otherwise joined to the support legs 42 via mechanical fasteners, such as bolts, rivets, screws, or other suitable fasteners. One of ordinary skill in the relevant art will understand that any suitable shape or coupling between the forward cross bar 46 and/or the aft cross bar 56 and the support legs 42 may be used that will provide sufficient stability and strength for the lower frame 18.

The coupling system 40 may comprise an upper rod 58 and a lower rod 60, as shown in FIGS. 1-13. The upper rod 58 may have a "U" or "V" shape. However, one of ordinary skill in the relevant art will understand that the upper rod 58 may have any suitable shape that provides sufficient coupling strength and stability for the seat 10.

In these embodiments, the upper rod 58 comprises a pair of extensions 62, wherein an aft end 64 of each extension 62 is coupled to a cross beam 66. The aft end 64 of each extension 62 may be welded, integrally formed, or otherwise joined to the cross beam 66 via mechanical fasteners, such as bolts, rivets, screws, or other suitable fasteners. One of ordinary skill in the relevant art will understand that any suitable shape or coupling between the pair of extensions 62 and the cross beam 66 may be used that will provide sufficient torsion beam strength for the upper rod 58. In certain embodiments, the cross beam 66 of the upper rod 58 is pivotally coupled to the lower rod aft pivot coupling location 54 located on the upper portion 48 of each support leg 42. In these embodiments, the upper rod aft pivot coupling location 50 may include receptacles that are configured to couple the cross beam 66 to the support legs 42, while also allowing the cross beam 66 to rotate relative to the support legs 42.

A forward end 68 of each extension 62 may be coupled to the upper rod forward pivot coupling location 25, which is located on the upper portion 24 of each support arm 20. In these embodiments, the upper rod forward pivot coupling location 25 may include receptacles that are configured to couple the forward ends 68 to the support arms 20, while also allowing the extensions 62 to rotate relative to the support arms 20.

As described above with respect to the upper rod 58, the lower rod 60 may also have a "U" or "V" shape. However, one of ordinary skill in the relevant art will understand that the lower rod 60 may have any suitable shape that provides sufficient coupling strength and stability for the seat 10.

In these embodiments, as illustrated in FIGS. 1, 7-8, and 10-13, the lower rod 60 comprises a pair of extensions 70, wherein an aft end 72 of each extension 70 is coupled to a cross beam 74. The aft end 72 of each extension 70 may be welded, integrally formed, or otherwise joined to the cross beam 74 via mechanical fasteners, such as bolts, rivets, screws, or other suitable fasteners. One of ordinary skill in the relevant art will understand that any suitable shape or coupling between the pair of extensions 70 and the cross beam 74 may be used that will provide sufficient torsion beam strength for the lower rod 60. In certain embodiments, the cross beam 74 of the lower rod 60 is pivotally coupled to the lower rod aft pivot coupling location 54 located on the lower aft end 52 of each support leg 42. In these embodiments, the lower rod aft pivot coupling location 54 may include receptacles that are configured to couple the cross beam 74 to the support legs 42, while also allowing the cross beam 74 to rotate relative to the support legs 42.

A forward end 76 of each extension 70 may be coupled to the lower rod forward pivot coupling location 32, which is located on the lower aft end 28 of each support arm 20. In these embodiments, the lower rod forward pivot coupling location 32 may include receptacles that are configured to couple the forward ends 76 to the support arms 20, while also allowing the extensions 70 to rotate relative to the support arms 20.

Figure 2:
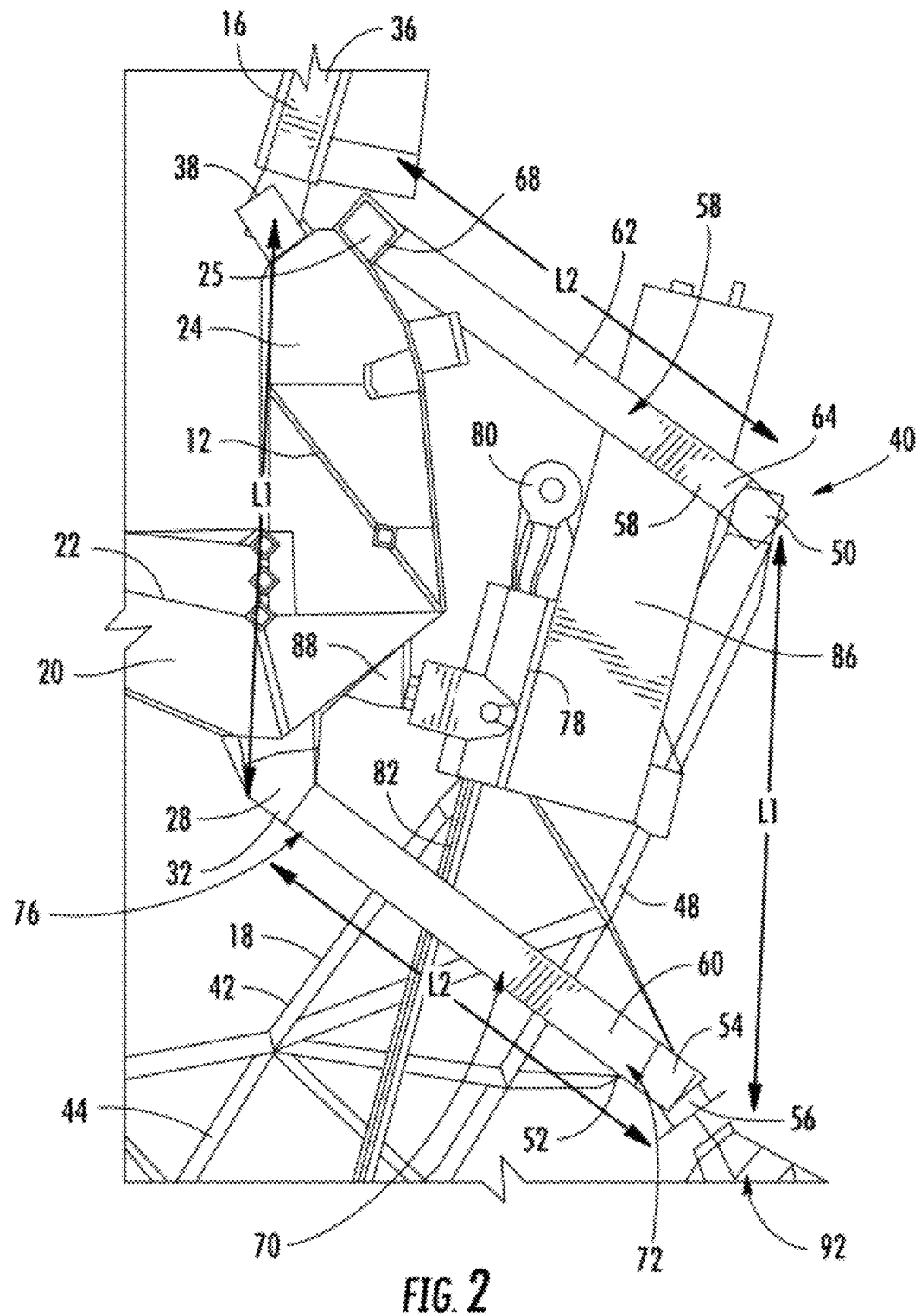
FIG. 2 is a partial side view of the seat of FIG. 1 with a portion of the support leg not shown for purposes of illustrating the linear actuator and coupling arrangements.
Figure 3:
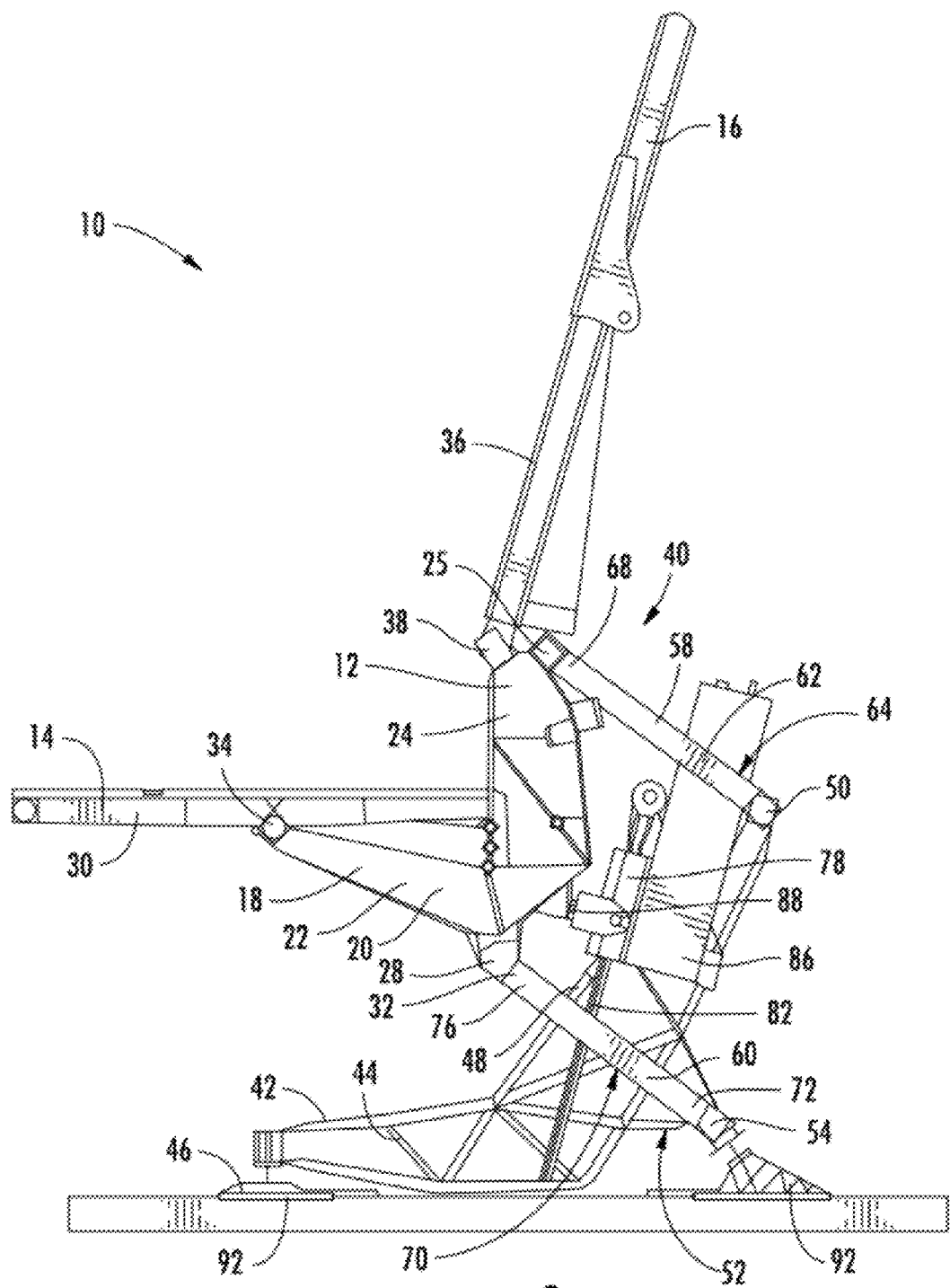
FIG. 3 is a side view of the seat of FIG. 1 with a portion of the support leg not shown for purposes of illustrating the linear actuator and coupling arrangements.
Figure 7:
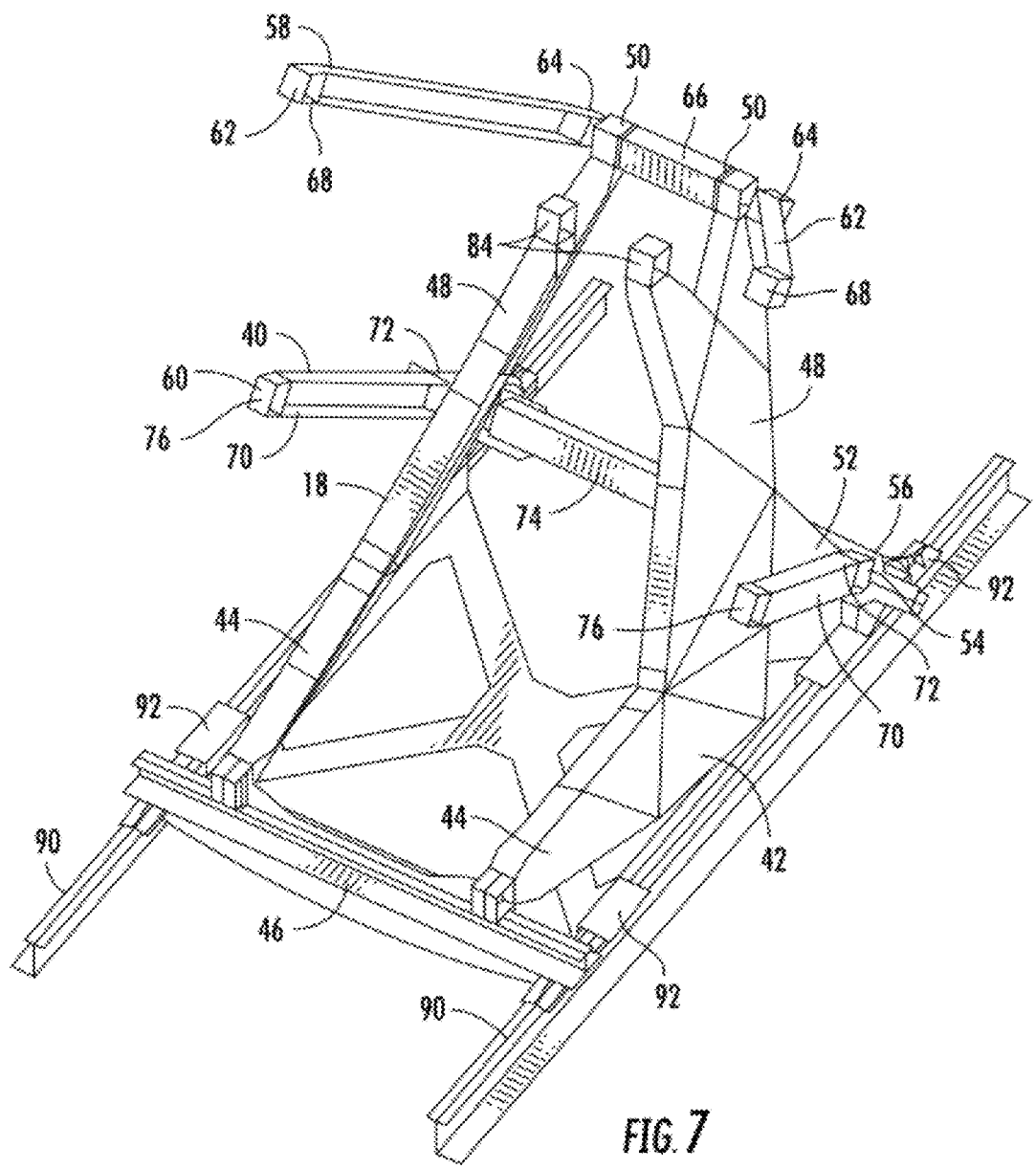
FIG. 7 is a front perspective view of the lower frame and coupling system of the seat of FIG. 1.
Figure 8:
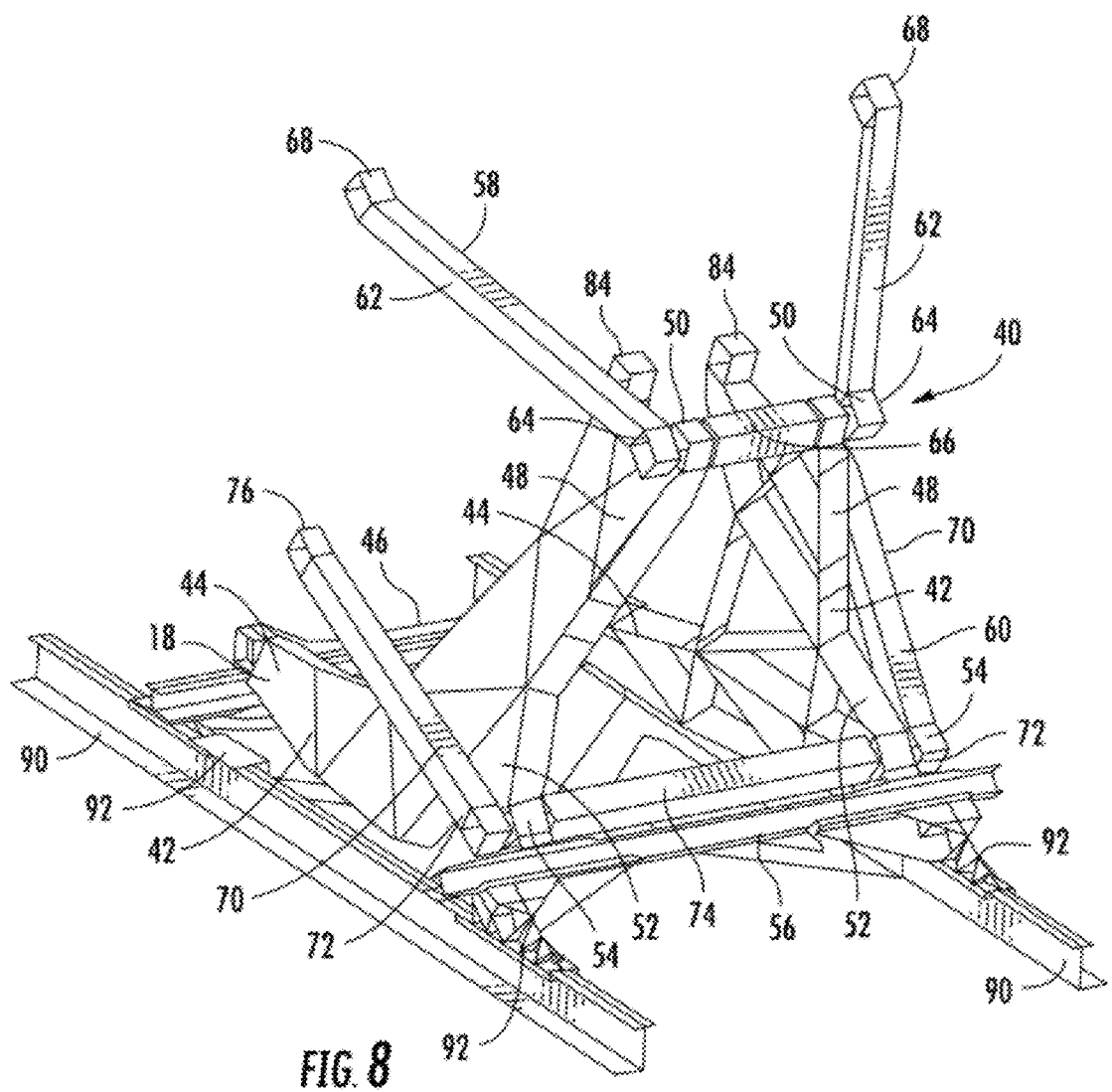
FIG. 8 is a rear perspective view of the lower frame and coupling system of the seat of FIG. 1.

In certain embodiments, as best illustrated in FIG. 2, the coupling system 40 may form a parallelogram shape on each side of the seat 10. In these embodiments, the upper rod forward pivot coupling location 25 and the lower rod forward pivot coupling location 32 positioned on each support arm 20 may be aligned substantially vertically and positioned a distance L1 from each other. Likewise, the upper rod aft pivot coupling location 50 and the lower rod aft pivot coupling location 54 may be aligned substantially vertically and also positioned a distance L1 from each other. As a result, the two distances L1 may form substantially vertical sides of the parallelogram shape. The extensions 62 of the upper rod 58 may be configured to have substantially the same length as the extensions 70 of the lower rod 60, so that the extensions 62, 70 may form the transverse sides L2 of the parallelogram shape on each side of the seat 10.

The pivotal coupling of the upper rod 58 and the lower rod 60 to the upper frame 12 and the lower frame 18, respectively, allows the upper frame 12 to vertically adjust between a broad range of positions relative to the lower frame 18. To control the vertical adjustment of the upper frame 12, a linear actuator 78 may be included. In the embodiments shown in FIGS. 1-2, 7-8, and 10, an upper end 80 of a track 82 for the linear actuator 78 may be coupled to a projection 84 positioned on the upper portion 48 of each support leg 42. In these embodiments, mechanical fasteners, such as bolts, rivets, screws, or other suitable fasteners, may be used to couple the upper end 80 of the track 82 to the projections 84. In other embodiments, the upper end 80 of the track 82 may be pivotally coupled to the projections 84, wherein a pivot bar or other pivotal coupling mechanism may be used to allow the upper end 80 of the track 82 to pivot relative to the projections 84.

Thus, in these embodiments, the support legs 42 may be positioned at an angle toward a central location, such that the distance between the lower portions 44 of the support legs 42 is greater than the distance between the upper portions 48 of the support legs 42. The shorter distance between the upper portions 48 allows the projections 84 to be positioned at a sufficiently close distance to each other to couple to the track 82 and provide support for the linear actuator 78, while also allowing the lower portions 44 to be spaced further apart to provide sufficient support for the seat 10.

In some embodiments, the track 82 may be a threaded rod that passes through a similarly threaded aperture in the linear actuator 78. A motor 86 may be coupled to the linear actuator 78, which may be operated to apply a force to move linear actuator 78 along the track 82.

The linear actuator 78 is also coupled to the upper frame 12. In these embodiments, a pair of bars 88 may extend downwardly at an angle from each end of the upper cross bar 26 toward a central location, where the bars 88 are coupled to the linear actuator 78. The coupling between the upper frame 12 and the linear actuator 78 allows the upper frame 12 to travel with the linear actuator 78 as it moves along the track 82. In these embodiments, mechanical fasteners, such as bolts, rivets, screws, or other suitable fasteners, may be used to couple the linear actuator 78 to the upper frame 12. In other embodiments, the linear actuator 78 may be pivotally coupled to the upper frame 12, wherein a pivot bar or other pivotal coupling mechanism may be used to allow the linear actuator 78 to pivot relative to the upper frame 12.

As the linear actuator 78 moves upward toward the top of the track 82 (a high position, as shown in FIG. 4), the upper frame 12 also moves upward, which rotates the upper rod 58 and the lower rod 60 in an upward and aft direction. As a result, the sides L2 of the parallelogram are angled upward in a forward direction.

When the linear actuator 78 moves downward toward the center of the track 82 (a medium position, as shown in FIG. 5), the upper frame 12 also moves downward, which rotates the upper rod 58 and the lower rod 60 in a downward and forward direction. As a result, the sides L2 of the parallelogram are more aligned with a horizontal orientation.

When the linear actuator 78 moves downward toward the bottom of the track 82 (a low position, as shown in FIG. 6), the upper frame 12 also moves downward, which rotates the upper rod 58 and the lower rod 60 in an downward and forward direction. As a result, the sides L2 of the parallelogram are angled downward in a forward direction.

Figure 11:
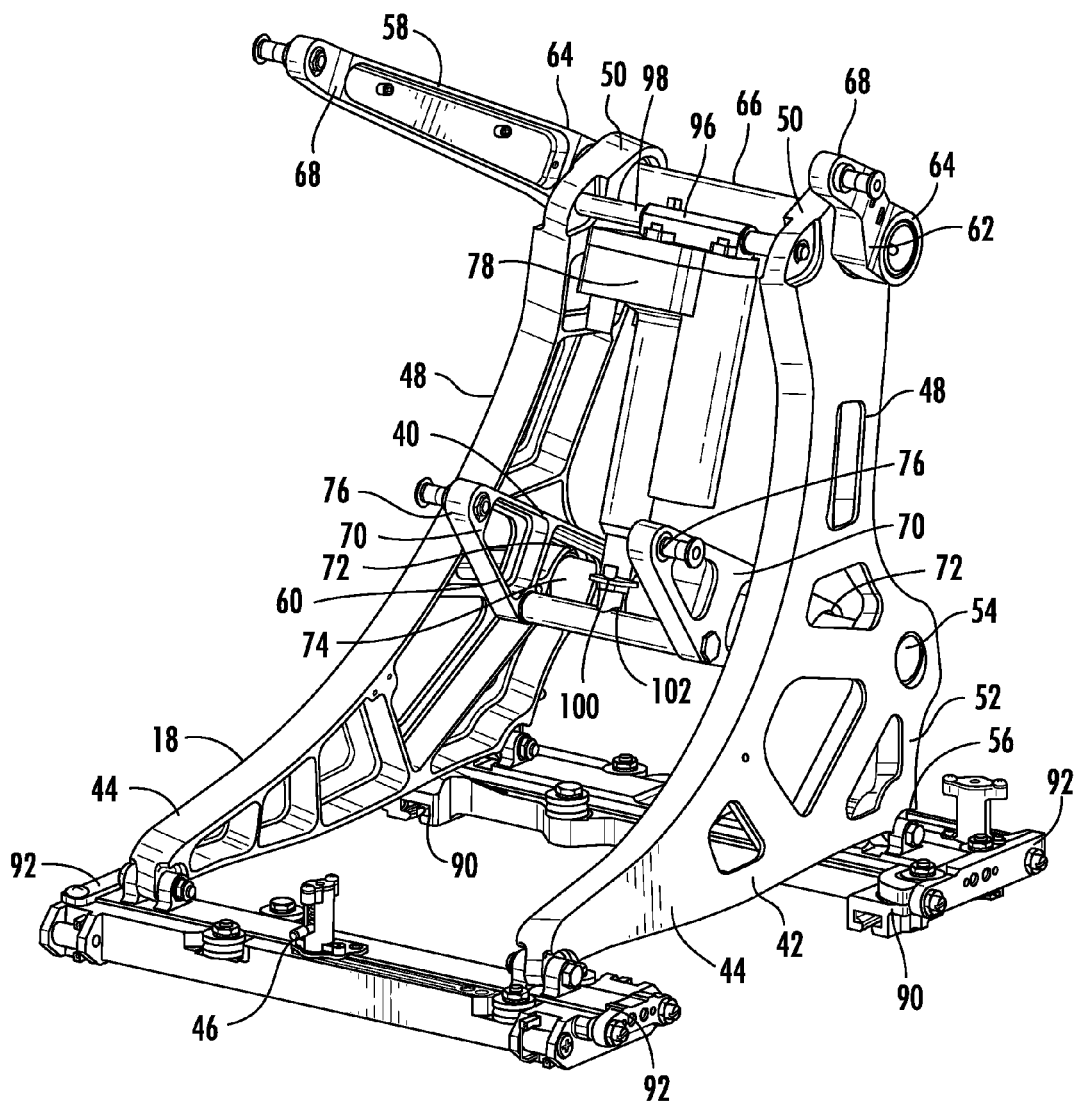
FIG. 11 is a front perspective view of a lower frame and coupling system of a seat according to alternative embodiments of the present invention.
Figure 12:
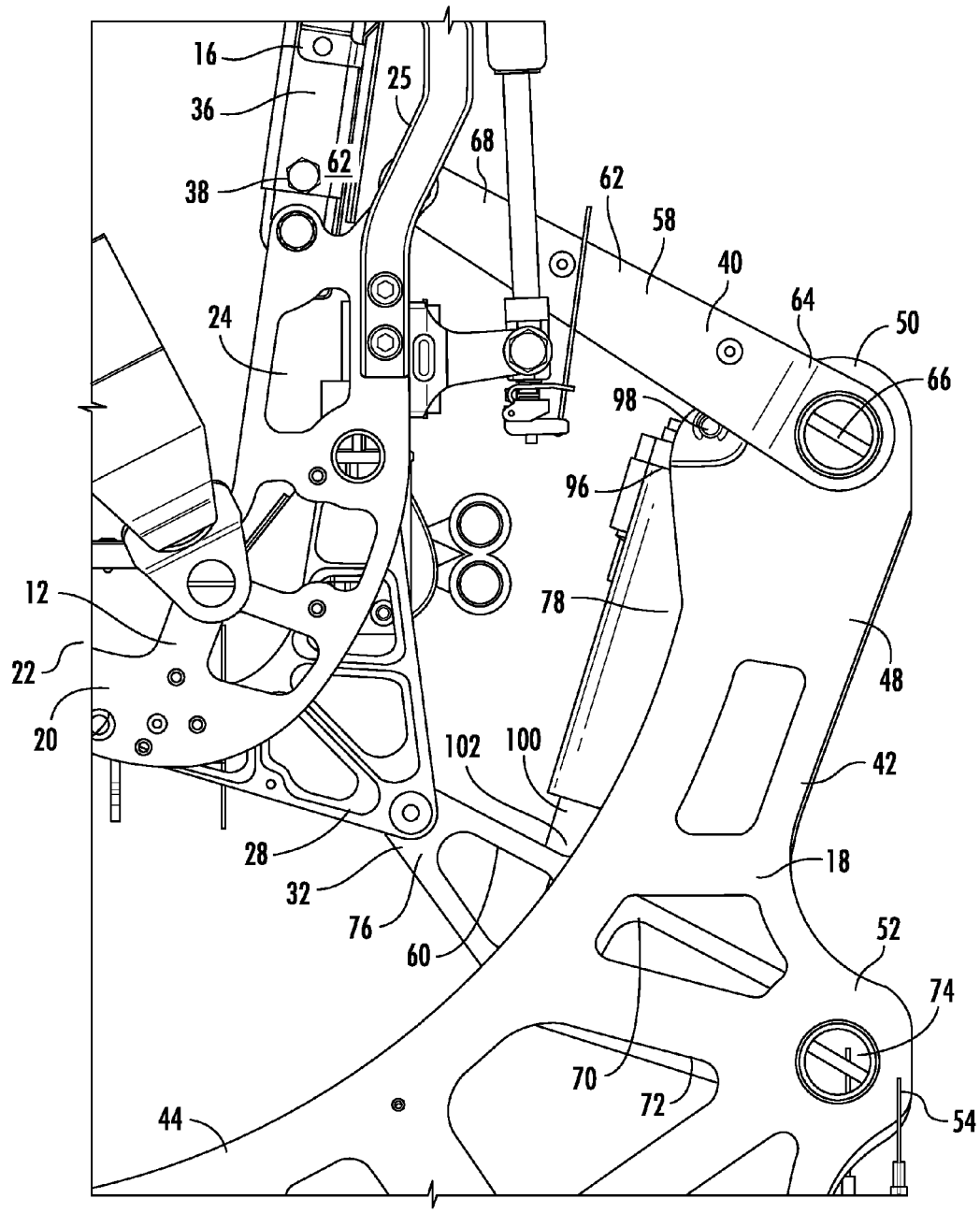
FIG. 12 is a partial side view of the lower frame and coupling system of FIG. 11 with an upper frame of a seat according to alternative embodiments of the present invention.
Figure 13:
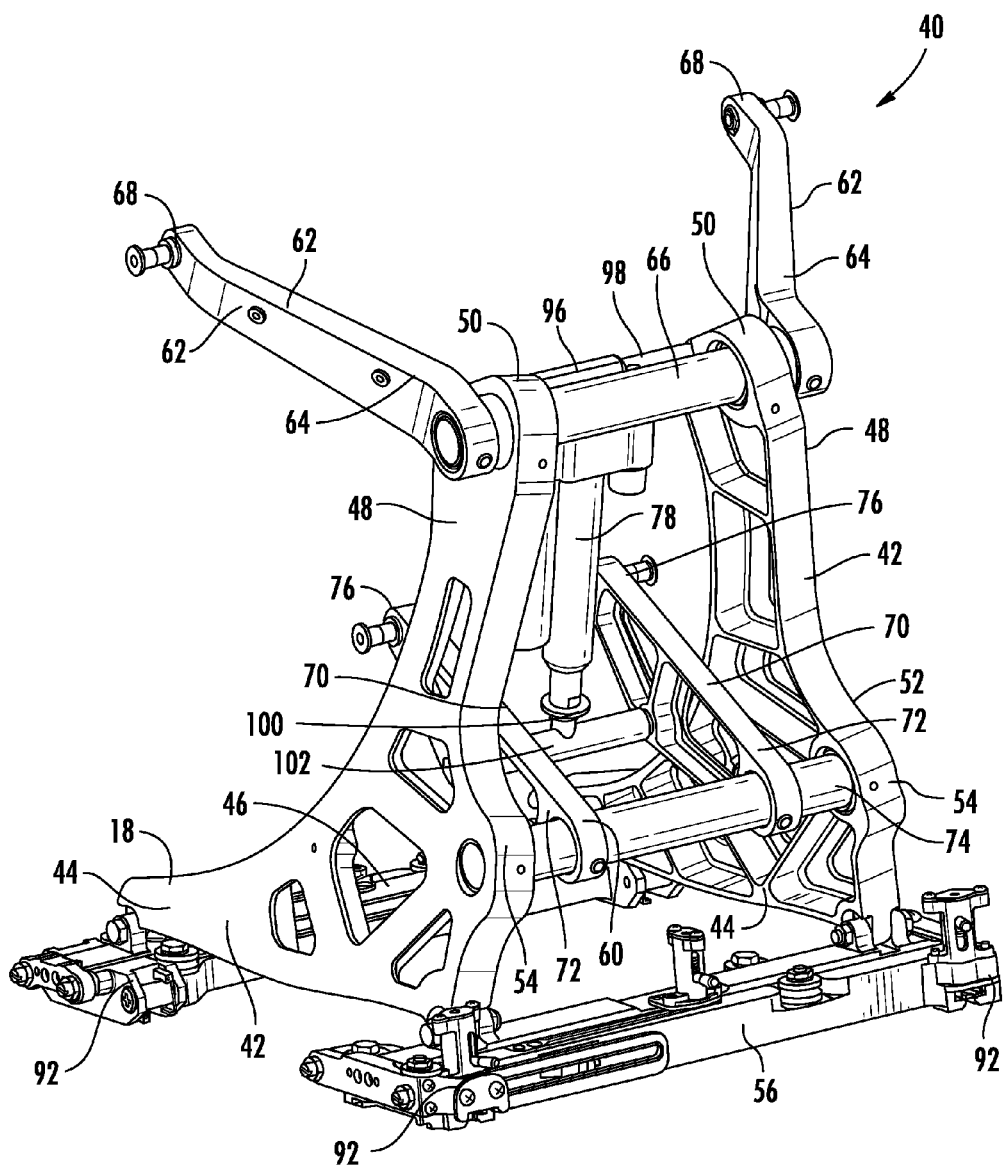
FIG. 13 is a rear perspective view of the lower frame and coupling system of FIG. 11.

In other embodiments, as shown in FIGS. 11-13, the linear actuator 78 may include a recline lock or other suitable mechanism, which may be used to control the vertical adjustment of the upper frame 12. In these embodiments, a first end 96 of the linear actuator 78 may be coupled to a coupling location 98 on the lower frame 18. In the embodiments illustrated in FIGS. 11-13, the coupling location 98 is a cross bar positioned forward and adjacent the cross beam 66. However, one of ordinary skill in the relevant art will understand that the coupling location 98 may be any suitable location on the lower frame 18. In these embodiments, mechanical fasteners, such as bolts, rivets, screws, or other suitable fasteners, may be used to couple the first end 96 of the linear actuator 78 to the coupling location 98. In other embodiments, the first end 96 of the linear actuator 78 may be pivotally coupled to the coupling location 98, wherein a pivot bar or other pivotal coupling mechanism may be used to allow the linear actuator 78 to pivot relative to the lower frame 18.

In these embodiments, a second end 100 of the linear actuator 78 may be coupled to a coupling location 102 on the upper frame 12 and/or the coupling system 40. In the embodiments illustrated in FIGS. 11-13, the coupling location 102 is a cross bar positioned forward and adjacent the cross beam 74. However, one of ordinary skill in the relevant art will understand that the coupling location 102 may be any suitable location on the upper frame 12 and/or the coupling system 40 (such as the upper rod 58) that is configured to pivot relative to the lower frame 18. In these embodiments, mechanical fasteners, such as bolts, rivets, screws, or other suitable fasteners, may be used to couple the second end 100 of the linear actuator 78 to the coupling location 102. In other embodiments, the second end 100 of the linear actuator 78 may be pivotally coupled to the coupling location 102, wherein a pivot bar or other pivotal coupling mechanism may be used to allow the linear actuator 78 to pivot relative to the coupling system 40. This type of coupling arrangement allows for use of a linear actuator 78 with a shorter stroke for the same amount of travel of the upper frame 12.

The seat 10 may be mounted to a track 90 in a floor of a vehicle via seat track fittings 92. The seat track fittings 92 may be coupled to each end of the forward cross bar 46 and the aft cross bar 56.

Figure 10:
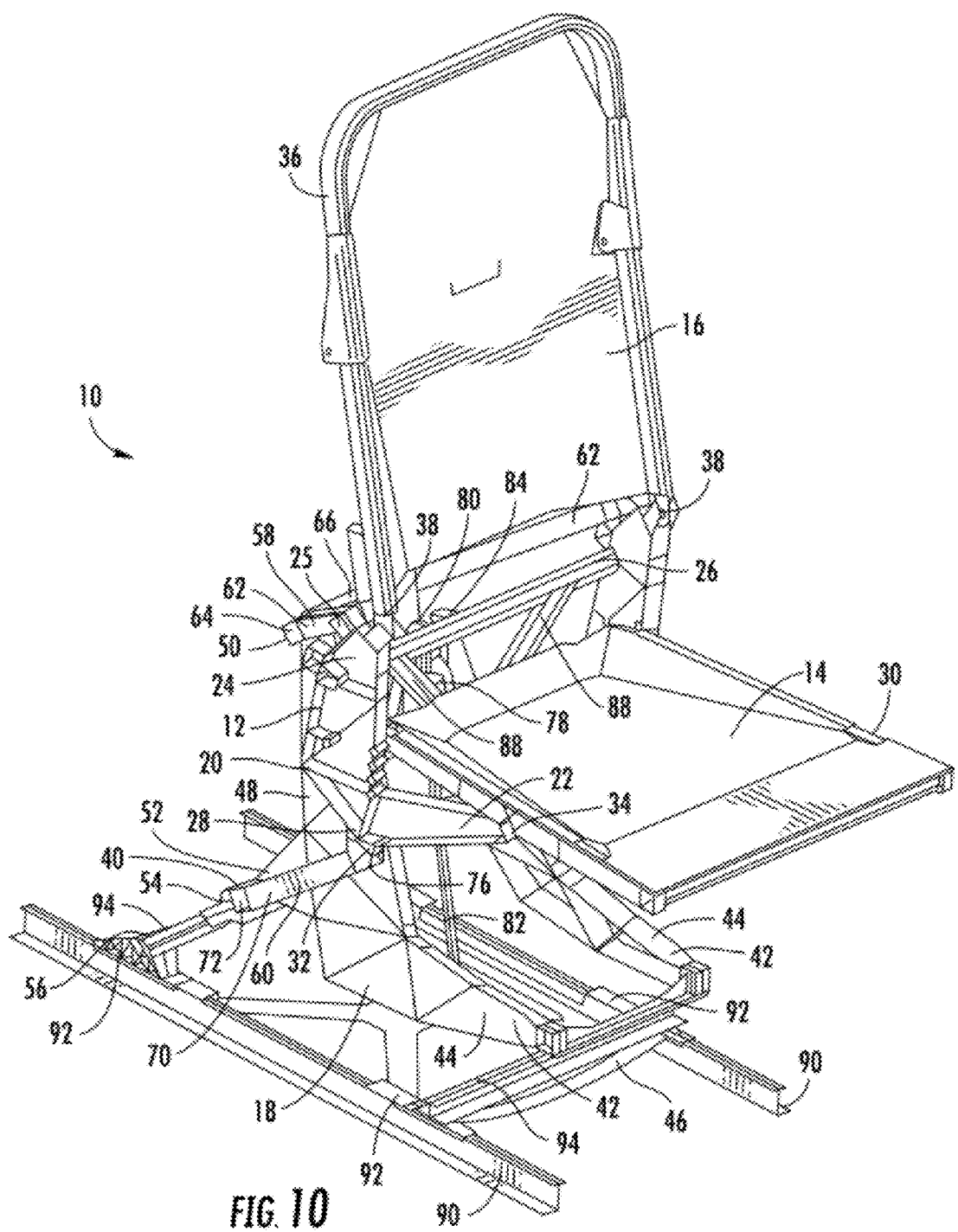
FIG. 10 is a perspective view of the seat of FIG. 1 in a lateral slide position.

In some embodiments, as shown in FIG. 10, the forward cross bar 46 and the aft cross bar 56 may each comprise a track 94 that allows the support legs 42 to slidingly couple to the forward cross bar 46 and the aft cross bar 56. In these embodiments, the seat 10 may then slide laterally relative to the track 94.

In some embodiments, the support legs 42, forward cross bar 46, aft cross bar 56, and cross beams 66, 74 are configured to link the upper rod 58, the lower rod 60, and the linear actuator 78 more closely to the rear seat track fittings 92 and/or to limit the effect of floor deformation by reducing the distance of the front attachments of the lower portion 44 of each support leg 42 on the forward cross bar 46.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. An adjustable seat comprising:
   a lower frame comprising a pair of non-parallel support legs, wherein each support leg comprises an upper portion, a lower forward portion, and a lower aft end, wherein each support leg is vertically and longitudinally angled toward a central location so that the distance between the upper portions is less than the distance between the lower forward portions and the distance between the lower forward portions is less than the distance between the lower aft ends;
   an upper frame comprising a pair of support arms;
   a coupling system comprising an upper rod and a lower rod, wherein the upper rod and the lower rod are pivotally coupled to each of the pair of support arms and the pair of support legs; and
   a linear actuator comprising a first end and a second end wherein the first end is coupled to a coupling location on the lower frame and the second end is coupled to a coupling location on the coupling system, wherein the coupling location on the coupling system comprises a cross bar positioned on the upper rod or the lower rod.

2. The adjustable seat of claim 1, wherein the pivotal coupling allows the upper frame to vertically adjust between a broad range of positions relative to the lower frame.

3. The adjustable seat of claim 2, further comprising a track coupled to the lower frame, wherein the linear actuator is configured to travel along the track to vertically adjust the upper frame between the broad range of positions relative to the lower frame.

4. The adjustable seat of claim 3, wherein the upper frame is in a high position when the linear actuator is positioned proximate an upper end of the track and the upper rod and the lower rod are angled upward in a forward direction, and the upper frame is in a low position when the linear actuator is positioned proximate a lower end of the track and the upper rod and the lower rod are angled downward in a forward direction.

5. The adjustable seat of claim 1, wherein the distance between the lower aft ends is configured to provide sufficient support for the adjustable seat.

6. The adjustable seat of claim 1, wherein the distance between the lower forward portions is less than the distance between the lower aft ends so as to limit an effect of floor deformation.

7. The adjustable seat of claim 1, wherein the support legs are slidingly coupled to a forward cross bar and an aft cross bar.

8. The adjustable seat of claim 1, further comprising a seat pan pivotally coupled to the upper frame, and a back rest pivotally coupled to the upper frame.

9. An adjustable seat comprising:
   (a) an upper frame comprising a pair of support arms, wherein each support arm comprises an upper portion and an aft end;
   (b) a lower frame comprising a pair of non-parallel support legs, wherein each support leg comprises an upper portion, a lower forward portion, and a lower aft end, wherein each support leg is vertically and longitudinally angled toward a central location so that the distance between the upper portions is less than the distance between the lower forward portions and the distance between the lower forward portions is less than the distance between the lower aft ends;
   (c) an upper rod comprising a pair of extensions and a cross beam, wherein each extension is pivotally coupled to the upper portion of each support arm and the cross beam is pivotally coupled to the upper portion of each support leg; and
   (d) a lower rod comprising a pair of extensions and a cross beam, wherein each extension is pivotally coupled to the aft end of each support arm and the cross beam is pivotally coupled to the aft end of each support leg.

10. The adjustable seat of claim 9, wherein the pivotal coupling allows the upper frame to vertically adjust between a broad range of positions relative to the lower frame.

11. The adjustable seat of claim 9, wherein the distance between the lower aft ends is configured to provide sufficient support for the adjustable seat.

12. The adjustable seat of claim 10, further comprising a linear actuator coupled to the upper frame, and a track coupled to the lower frame, wherein the linear actuator is configured to travel along the track to vertically adjust the upper frame between the broad range of positions relative to the lower frame.

13. The adjustable seat of claim 12, wherein the upper frame is in a high position when the linear actuator is positioned proximate an upper end of the track and the upper rod and the lower rod are angled upward in a forward direction, and the upper frame is in a low position when the linear actuator is positioned proximate a lower end of the track and the upper rod and the lower rod are angled downward in a forward direction.

* * * * *